UNITED STATES PATENT OFFICE.

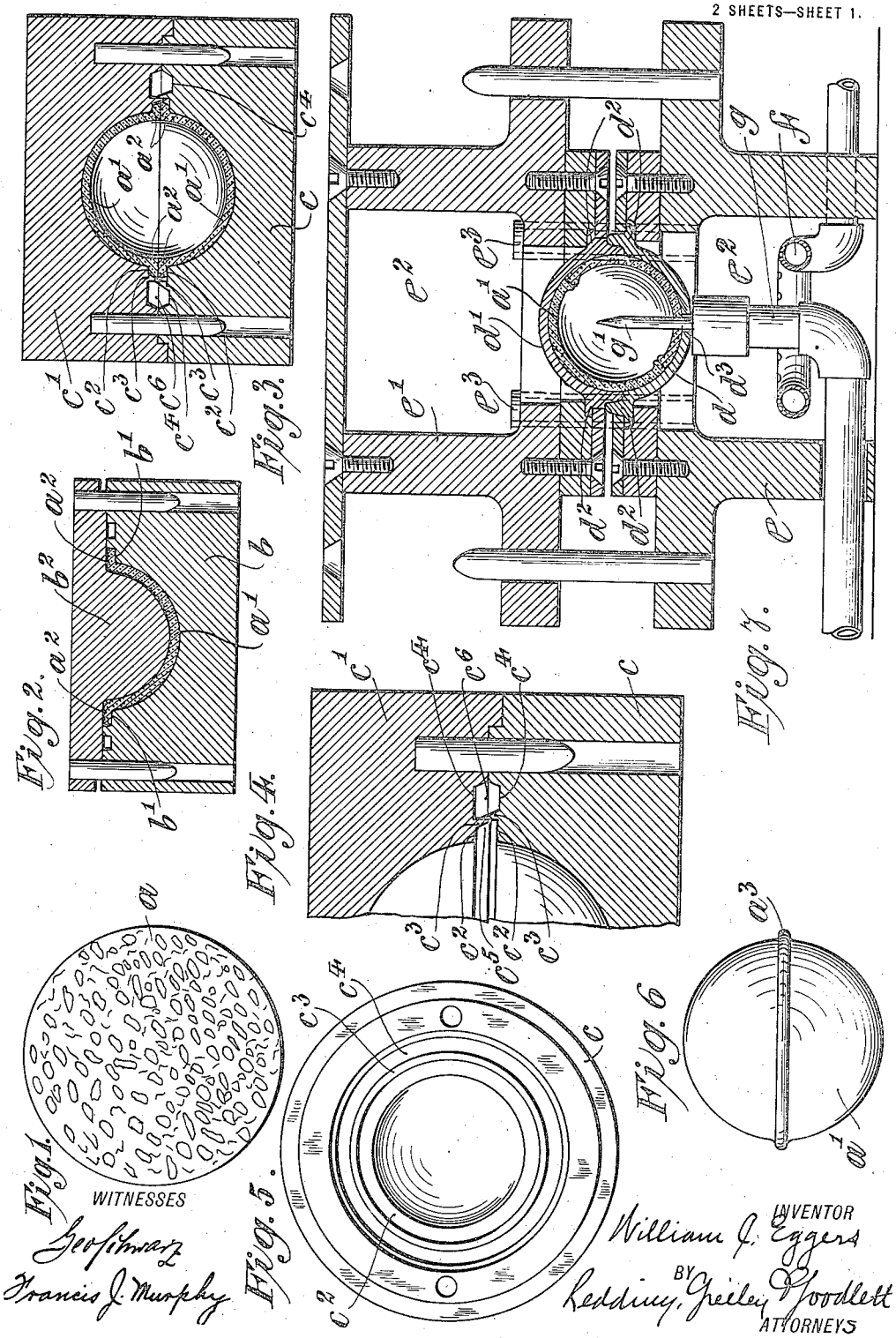

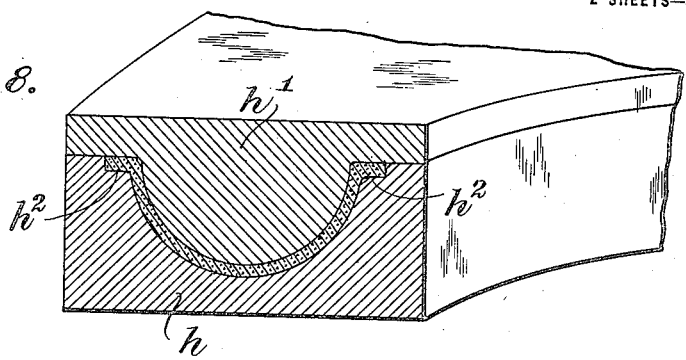
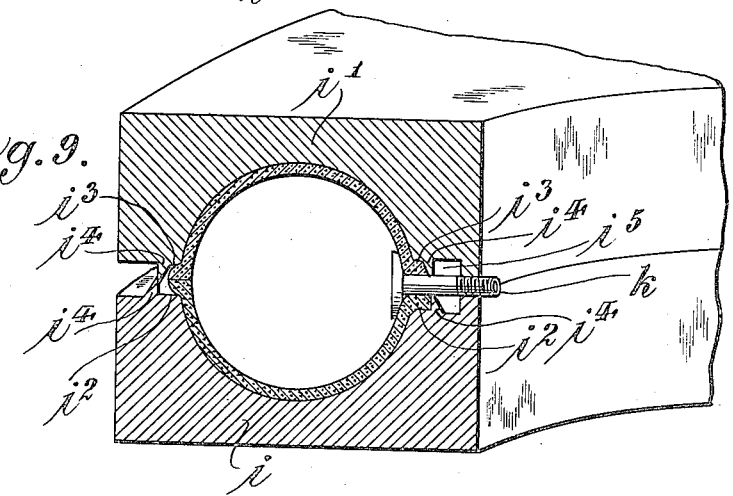
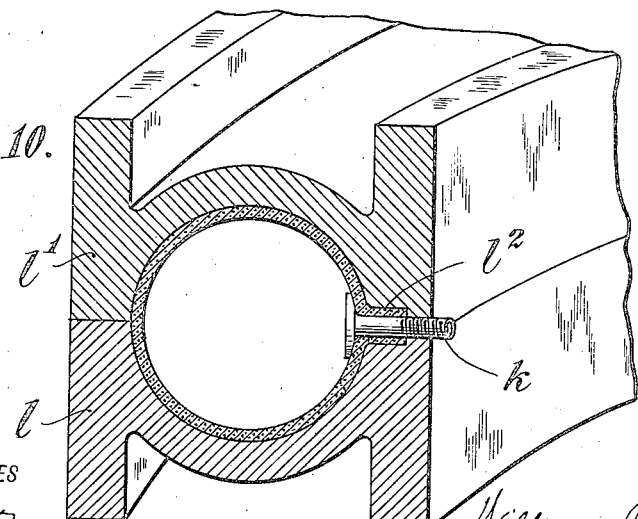

WILLIAM J. EGGERS, OF NEW YORK, N. Y.

MANUFACTURE OF RUBBER ARTICLES.

1,163,987. Specification of Letters Patent. Patented Dec. 14, 1915.

Application filed November 10, 1914. Serial No. 871,234.

*To all whom it may concern:*

Be it known that I, WILLIAM J. EGGERS, a citizen of the United States, residing in the borough of Brooklyn of the city of New York, in the county of Kings, in the State of New York, have invented certain new and useful Improvements in the Manufacture of Rubber Articles, of which the following is a specification, reference being had to the accompanying drawings, which form a part hereof.

In the manufacture of hollow articles from rubber which cannot be made with a core but must be made in parts which are subsequently secured together, such as balls, bulbs, water bags, inner tubes for tires, etc., as such manufacture is usually carried on, the raw or unvulcanized rubber, as it comes in somewhat rough sheets from the mill, is passed through calender rolls in order that the sheets may be reduced to a uniform thickness; then, in the manufacture of a ball, for example, two disks are cut from the calendered sheet to form the two halves of the ball; then the two halves have their edges cemented and are pressed together by hand, a small quantity of water or of water and ammonia, being placed within the sphere thus formed; then the sphere thus formed is placed in the vulcanizer and is subjected for a sufficient time to a degree of heat necessary to effect the vulcanization, the water or other substance placed within the sphere being vaporized and forcing the rubber closely against the surface of the mold; and finally the vulcanizing mold and the ball therein are permitted to cool until the vapor within the ball has been condensed sufficiently to permit the ball to be removed from the mold without distortion by internal pressure. This common method of manufacture involves a substantial item of expense in the hand labor required in applying cement to the edges of the hemispheres and in assembling them; it also involves either a great number of molds or slow production because of the length of time required for the cooling of the vulcanizing mold and the article before the article can be safely withdrawn, each vulcanizing mold being limited usually to two heats in each working day; and it results in a line of weakness, articles made in the old way almost invariably breaking first in the line of the cemented joint between the two parts of the article.

It is the object of this invention to improve the method of manufacture of such articles so as to reduce largely the cost of manufacture, such improved method rendering unnecessary calendering of the sheets of raw rubber, doing away altogether with the employment of hand labor in cementing and assembling the two parts of the article, reducing greatly the time required for complete vulcanizing, eliminating in great part or altogether the time required for the cooling of the vulcanizing mold and the article, and securing a practically homogeneous article without any line of cleavage or weakness.

The invention will be explained more fully hereinafter with reference to the accompanying drawings in which the successive steps are illustrated as far as possible with sufficient representation of apparatus or mechanical devices employed to enable the invention to be understood and practised.

In the drawings, in which, for convenience, there is illustrated the manufacture of a ball, with the mechanical devices suited thereto, Figure 1 is a view of a disk of raw or unvulcanized rubber which is to form one-half of the ball. Fig. 2 is a view in section of a mold employed in forming the disk of raw rubber into a half ball, such half ball being shown in place in the mold. Fig. 3 is a view in section of a mold employed in uniting the two half balls of raw rubber, the roughly formed ball of raw rubber being shown in place therein. Fig. 4 is a detail view in section through the coöperating portions of the two members of the mold shown in Fig. 3. Fig. 5 is a face view of the upper member of the mold shown in Fig. 3. Fig. 6 is a detail view of the ball of crude rubber as it comes from the mold shown in Fig. 3. Fig. 7 is a view in section of the vulcanizer or vulcanizing mold, with a ball therein. Figs. 8, 9 and 10 are detail views illustrating the application of the improved method to the manufacture of inner tubes for tires.

In the practice of the improved method the sheet of raw or unvulcanized rubber, is taken as it comes from the mill, without calendering, and from it are cut the two blanks which form eventually the two parts of the hollow article to be manufactured. Each of such blanks, one of which, adapted for the formation of a ball, is shown at $a$ in Fig. 1, is then cupped or formed roughly into a hemisphere or half ball, as shown at $a'$ in Fig. 2, with a projecting flange $a^2$. The mold in which this half article is formed is suited of course to the article to be manufactured. In the formation of a ball, as illustrated in the drawings, the mold, shown in Fig. 2, consists of a female member $b$, which is recessed as at $b'$ at the margin of the cavity for the formation of the flange $a^2$ above mentioned, and a male member $b^2$ which conforms to the female member, but with the plunger or core portion of slightly smaller diameter. In such a mold the blank is subjected to moderate heat and pressure so that when the mold is opened the raw rubber blank has roughly a hemispherical form (in the case of a ball) with an outwardly projecting flange. Two of the hemispheres $a'$, of raw rubber, with corresponding flanges $a^2$, are then placed respectively in the members of a mold such as that shown in Fig. 3. The two members $c$ and $c'$ of this mold may be formed substantially alike, each having immediately about the margin of its cavity an annular recess $c^2$, within an annular cutting edge $c^3$, projecting beyond the face of the recess $c^2$, and then, outside of the cutting edge, an annular recess $c^4$. The two annular cutting edges $c^3$ are so shaped and placed that when the two parts of the mold are assembled one annular cutting edge enters closely within the other, as shown in Figs. 3 and 4, with an annular space $c^5$ within the cutting edge and an annular space $c^6$ outside of it. In this mold the two projecting flanges $a^2$, of the two parts of the roughly formed article, are pressed closely together between the faces of the recesses $c^2$, being caused, under the conditions of moderate temperature and considerable pressure, to cohere and become united in a homogeneous mass. The outer portions of the two flanges of raw rubber are cut off by the annular knives $c^3$, so as to leave only a narrow projecting bead on the outside of the roughly formed ball of raw rubber, and the parts thus cut off are received in the chamber $c^6$ formed by the recesses $c^4$. The roughly formed article of raw rubber, with its parts closely and intimately united by pressure and having the projecting bead $a^3$, is then transferred to the vulcanizer mold and vulcanized. The vulcanizer may be of any suitable character, according to the nature of the article. The vulcanizer shown in Fig. 7, adapted for the manufacture of rubber balls, comprises two shell molds $d$ and $d'$, supported by external flanges $d^2$ in a two-part frame $e$ $e'$, one of the shell molds $d$ having at any convenient point, as at $d^3$, an aperture for a purpose to be described. In the structure shown each of the two parts $e$ and $e'$ of the frame or casing of the vulcanizer has a chamber $e^2$ into which projects the corresponding shell mold $d$ or $d'$. The lower member $e$ of the frame receives a source of heat, such as the Bunsen burner $f$ and the heated air may be conducted from the chamber of the lower member to the chamber of the upper member by flues $e^3$, so that the comparatively thin shell molds are completely surrounded by the hot air and products of combustion and are therefore raised quickly to the proper vulcanizing temperature. There is also introduced into one of the frame members, as $e$, a pipe, as $g$, connected with a source of air or other suitable fluid under pressure (usually about twenty-five pounds), and at a suitable temperature for vulcanizing (usually about 300° F.), such pipe being provided with a suitable nozzle, as $g'$, which passes through the aperture $d^3$ in the corresponding member of the mold and penetrates the raw rubber wall of the article within the mold. By thus introducing a fluid under pressure into the article being vulcanized the internal pressure necessary to press the rubber closely against the inner surface of the mold during the vulcanization is provided and at the same time it becomes possible to relieve the pressure as soon as the vulcanizing is completed and just before the mold is opened so that the mold can be opened as soon as the vulcanizing is completed without requiring the mold to be cooled down before opening, as in the old method, in order to permit the vapor within the article to be condensed before the external pressure is relieved and thereby prevent distortion or rupture of the article. Furthermore the introduction of air or other fluid at a vulcanizing temperature permits the rubber and the mold to be raised more quickly to the vulcanizing temperature. In this manner a great amount of time is saved, as compared with the usual method of manufacture, the molds can be used many more times in a day, and the amount of capital locked up in molds for a given production is greatly reduced. In placing the article in the vulcanizer the position of the external bead $a^3$ can be disregarded, for in so placing the article the bead is simply pressed inward and in the process of vulcanizing is completely absorbed or obliterated, so that when the article comes from the mold there can be found on its surface no projection due to the bead and at most only a trace of it and of the joint formed by it is discernible.

The manufacture of water bags and other articles is carried on in substantially the same manner as that already described and with apparatus of similar character. Thus, in the manufacture of inner tubes for tires, the blanks are cut as rectangular strips from the sheet of raw rubber and are cupped by pressure in annular molds $h$ and $h'$ provided, as to one or the other, with recesses $h^2$, as shown in Fig. 8, for the formation of external flanges along the two edges of the cupped blanks, the two ends of each blank being lapped and united by pressure at the same time. The two cupped, annular blanks, are then placed in suitable annular molds $i$ and $i'$, formed with recesses $i^2$ $i^3$ and cutting edges $i^4$ and have their flanges united by pressure in a homogeneous union. The molds $i$ and $i'$ (see Fig. 9) are also notched in their opposite faces, as at $i^5$ for the purpose of permitting a flanged tire valve $k$, otherwise of ordinary construction, to be laid between the meeting edges of the two blanks and to be united therewith by pressure. The tube of raw rubber thus formed, with the valve in position, is then placed between the members $l$ and $l'$ of the vulcanizing mold (see Fig. 10), such members being notched as at $l^2$ to receive the valve $k$, and is vulcanized, the fluid under pressure from an external source being admitted through the valve $k$. The inner tube thus produced is not only homogeneous and seamless and therefore superior to any tube with a cemented seam, but the time required in the manufacture is greatly reduced as compared with the ordinary process of manufacture.

It will be obvious that the invention can be practised with different forms of apparatus from those illustrated herein and that some of the steps of the method herein described can be used independently of others.

I claim as my invention:—

1. The improvement in the method of manufacturing hollow rubber articles which consists in forming the article of raw rubber in separate parts with projecting flanges, uniting the parts by pressing the flanges together, subsequently vulcanizing the article in a separate vulcanizer mold and introducing fluid under pressure into the article from an external source during vulcanizing.

2. The improvement in the method of manufacturing hollow articles of rubber which consists in forming the article of raw rubber in separate parts with projecting flanges, uniting the flanges by pressure, and subsequently vulcanizing the hollow article in a separate mold with internal pressure derived from fluid introduced into the article under pressure from an external source.

3. The improvement in the method of manufacturing hollow articles of rubber which consists in cutting separate blanks from a sheet of raw rubber, forming the blanks by heating and pressure as parts of the article each with a projecting flange, assembling the parts of the article in a separate mold and pressing the flanges together, thus preparing the article for vulcanization and subsequently vulcanizing the hollow article in a separate mold and introducing fluid under pressure into the article from an external source during vulcanizing.

4. The improvement in the method of manufacturing hollow articles of rubber which consists in cutting separate blanks from a sheet of raw rubber, forming the blanks by heating and pressure as parts of the article each with a projecting flange, assembling the parts of the article in a separate mold and pressing the flanges together and subsequently vulcanizing the hollow article with internal pressure in a separate vulcanizer mold and introducing fluid under pressure into the article from an external source during vulcanizing.

5. The improvement in the method of manufacturing inner tubes for tires which consists in cutting blanks from a sheet of raw rubber, forming the blanks by heating and pressure as annular parts of the tube, each with projecting flanges on its edges, assembling the parts of the tube in a separate mold with a valve placed between the opposing edges, pressing the flanges together to form a homogeneous union, and subsequently vulcanizing the tube and the metallic valve therewith in a separate vulcanizer mold.

This specification signed and witnessed this 6th day of November, A. D. 1914.

WILLIAM J. EGGERS.

Signed in the presence of—
  W. B. GREELEY,
  WORTHINGTON CAMPBELL.